United States Patent
Su (10) Patent No.: US 7,719,867 B2
(45) Date of Patent: May 18, 2010

(54) VOLTAGE TRANSFORMER WITH SEQUENTIALLY SWITCHABLE VOLTAGE SELECTION CIRCUIT

(75) Inventor: Carl Su, Taipei (TW)

(73) Assignee: Kerio Technologies, Inc., Taipei (TW)

( * ) Notice: Subject to any disclaimer, the term of this patent is extended or adjusted under 35 U.S.C. 154(b) by 218 days.

(21) Appl. No.: 12/155,164

(22) Filed: May 30, 2008

(65) Prior Publication Data

US 2009/0212757 A1 Aug. 27, 2009

(30) Foreign Application Priority Data

Feb. 26, 2008 (TW) ............................. 97106821 A (51) Int. Cl.
*H02M 1/00* (2007.01)
*H01R 13/46* (2006.01)
(52) U.S. Cl. .................................. 363/146
(58) Field of Classification Search ........... 363/146; 323/293, 297, 352, 353, 354; 307/130, 150, 307/151
See application file for complete search history.

(56) References Cited

U.S. PATENT DOCUMENTS

| | | | |
|---|---|---|---|
| 4,321,525 A | 3/1982 | Imazeki et al. | |
| 5,347,211 A | 9/1994 | Jakubowski | |
| 6,628,535 B1 * | 9/2003 | Wu | 363/146 |
| 7,054,177 B2 * | 5/2006 | Wu | 363/146 |
| 7,242,115 B2 * | 7/2007 | Liu | 307/151 |
| 7,554,828 B2 * | 6/2009 | Wilson | 363/146 |
| 2004/0259436 A1 | 12/2004 | Su | |
| 2005/0219882 A1 | 10/2005 | Wu | |
| 2005/0259456 A1 | 11/2005 | Chiang | |
| 2007/0278859 A1 | 12/2007 | Su | |

FOREIGN PATENT DOCUMENTS

WO  WO 2005/104341  3/2005

\* cited by examiner

*Primary Examiner*—Gary L Laxton
(74) *Attorney, Agent, or Firm*—Bacon & Thomas, PLLC (57) ABSTRACT

A voltage transformer with a sequentially switchable voltage selection circuit is provided for converting input electrical energy through the sequentially switchable voltage selection circuit, which is arranged within the transformer body with its two ends electrically connected to an input port and an output port respectively, into one of a plurality of output voltage values and outputting the electrical energy. When it is desired to regulate an output voltage, a connection device must be plugged in a socket portion on the transformer body to initialize a micro control unit through feedback to change a voltage value sent to a voltage transformation unit, and in turn change the voltage of output electrical energy until a display device displays an ideal output voltage value. Then, the user removes the connection device, and the voltage value of the input electrical energy is converted into corresponding to the selected predetermined voltage value to output the electrical energy.

15 Claims, 11 Drawing Sheets

VOLTAGE TRANSFORMER WITH SEQUENTIALLY SWITCHABLE VOLTAGE SELECTION CIRCUIT

FIELD OF THE INVENTION

The present invention relates to a voltage transformer, and more particularly to a voltage transformer with a sequentially switchable voltage selection circuit.

BACKGROUND OF THE INVENTION

Voltage transformers have become indispensable to modern life, and especially in the electric appliance-ridden era, voltage transformers are used in a wide variety of electric appliances, such as walkmans, mobile phones, MP3, notebook computers, and the like. The specifications of voltage transformers are numerous. Some input voltages are 110 volt AC, others are 220 volt AC; the output specifications further varies from different electric appliances and includes more different specifications of output voltages, currents and plug dimensions.

Newer voltage transformers can receive all common input voltages and convert the input electrical energy within a specified range into the other output voltages to output the electrical energy. However, the output voltages of a voltage transformer are specified so that every family is usually equipped with various voltage transformers in order to meet the requirement of each electrical product. If a voltage transformer can provide multiple options of output voltages, it can satisfy various demands of the user and the number of voltage transformers can be significantly reduced, thus eliminating unnecessary problems. Particularly, when people go traveling abroad or go traveling on official business, carrying many kinds of different electrical products, it can eliminate many hassles and bring about great convenience in use.

Figure 1:
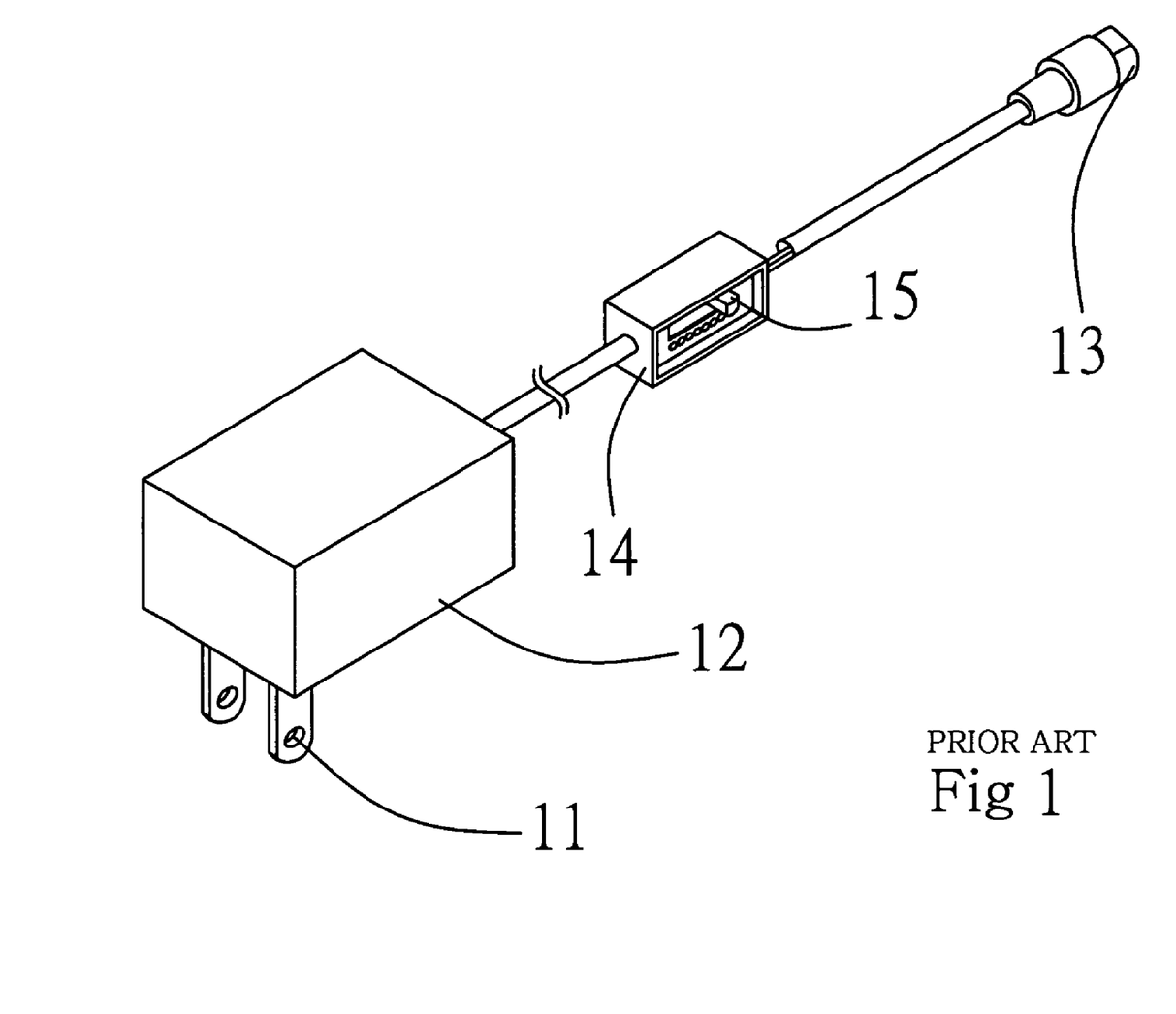
FIG. 1 is a three-dimensional schematic view of a conventional voltage transformer with adjustable output voltage.

A conventional voltage transformer with adjustable output voltage is shown in FIG. 1, wherein electrical energy with a fixed voltage Vin is inputted into a power supply input terminal 11, and output electrical energy with a fixed voltage Vout is generated at the power supply output end 13 through the voltage transformation circuit in the voltage transformer body 12. If it is necessary to change the output voltage value, as long as it needs to adjust the output voltage selector 15 on the output voltage selective switch 14 to a corresponding position, the voltage transformation circuit is then conduction-connected to several resistors each having different resistance value to generate a corresponding output voltage.

However, such selective switches are easily led to abrasion owing to frequent switching, and it makes the switching and positioning of the voltage selector 15 gradually deviated or imperfectly contacted and thus outputs unstable voltages or even incorrect voltages. When serious circumstances occur, it will result in damage of electrical products. In particular, since most output voltage values are simply indicated by stickers, they might be displaced from or fall off their original positions due to long-term use as well, thus misguiding the user to give incorrect outputs. Especially, the output voltage can be still changed by switching the switch 14 during the period at which the voltage transformer supplies the power. Once false touch causes the voltage transformer to be switched, it is possible to result in the risk of hazard and damaging an electrical product.

Figure 2:
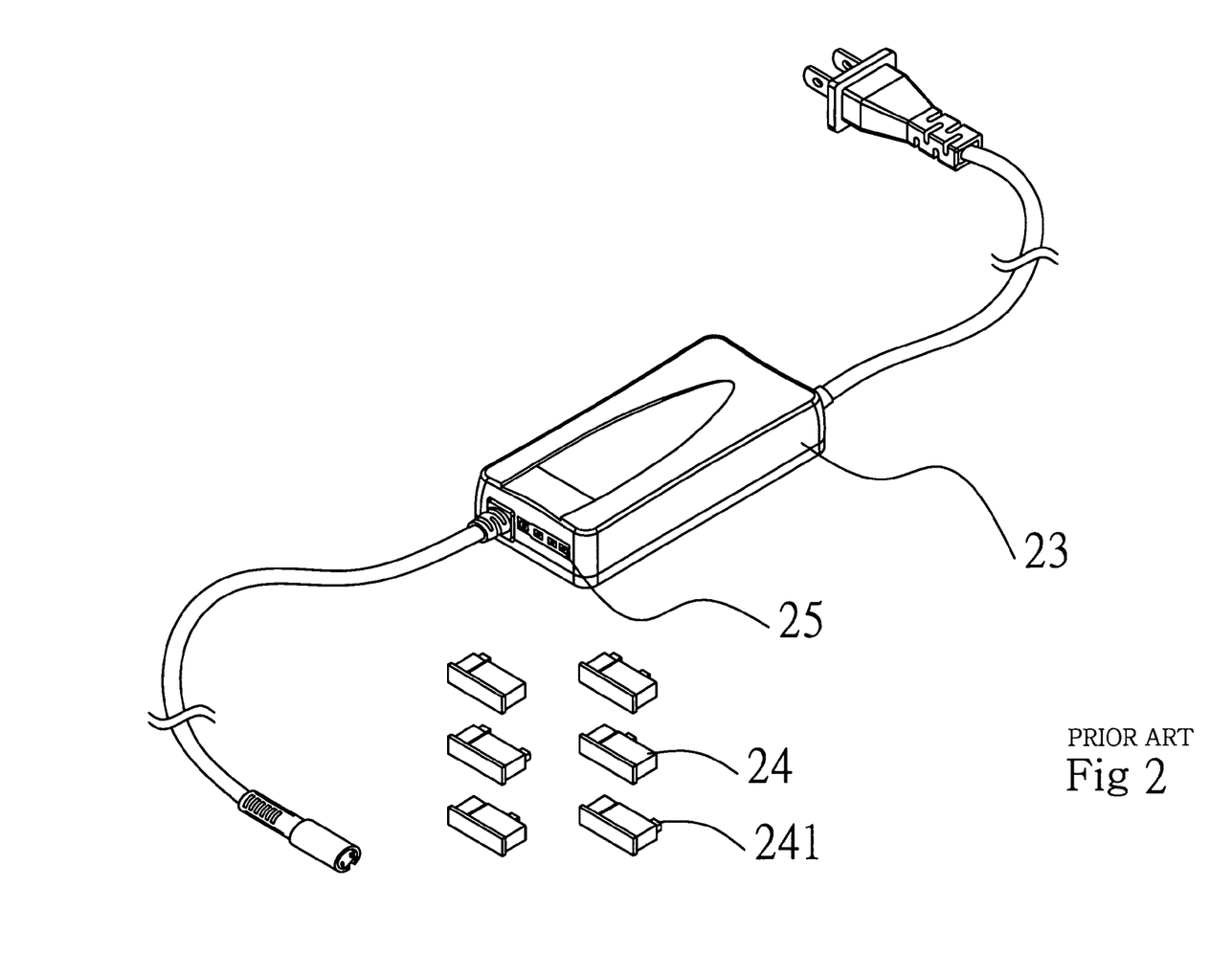
FIG. 2 is a three-dimensional schematic view of a conventional voltage transformer having various protruding plugs formed on its casing.

FIG. 2 shows a voltage transformer described in U.S. patent application Ser. No. 11/798,661, which is submitted by the applicants of the present invention. For the most part, the casing 23 is configured with a plurality of sockets 25, in combination with several different kinds of pins 24 that have projecting portions 241 with different shapes from each other and arranged at different positions respectively. Each socket 25 is provided therein with a corresponding mechanically actuatable switch. The projecting portions 241 are put into the sockets 25 by the arrangement of different pins 24 from each other, and the projecting portions push and prop their corresponding touch pieces to actuate the different mechanically actuatable switches respectively, thereby regulating the corresponding output voltages Vout. By means of such structural design, an unexpected change in the voltage can be avoided during operation, but many pins 24 may cause the problem of easily losing and uneasily carrying them.

Figure 3:
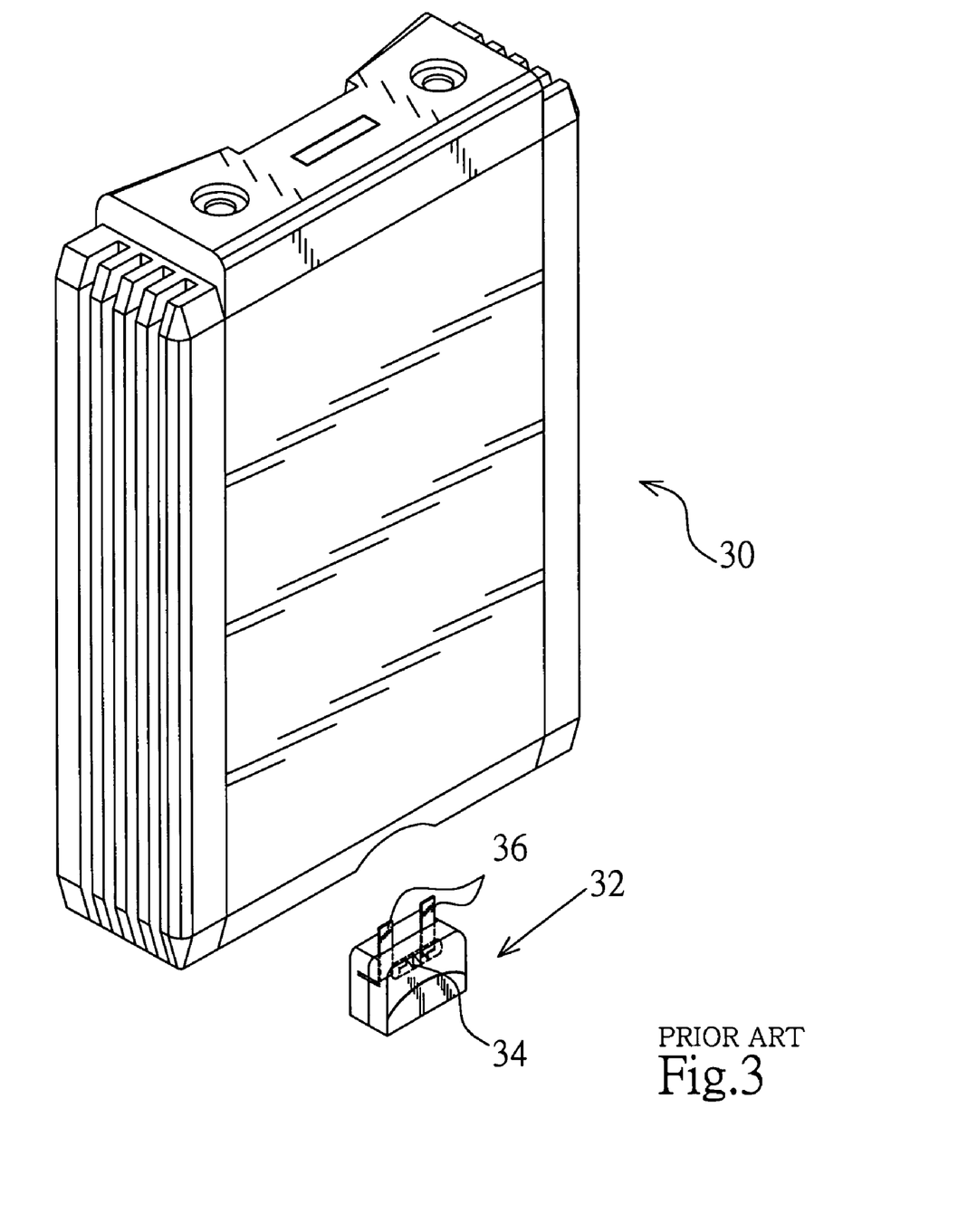
FIG. 3 is a three-dimensional schematic view of a conventional key type voltage transformer having different circuit elements disposed within its body.

FIG. 3 shows a power converter described in U.S. Pat. No. 5,347,211. The voltage transformer has a body 30, a plurality of keys 32, each of which contains a different electrical component 34 from the other, and has a body within which the electrical component is disposed. Each key 32 comprises two blades 36 for interconnection. When different keys are received by the keyway (not shown) formed within the body 30 respectively, the electrical interconnection to the converter circuit can be provided. The output voltage value of the converter circuit is determined by the value of the electrical component 34 such that the output voltage can be varied by replacing the key with another key. Similarly, many keys also cause the problem of carrying them. If the keys were missed, it would become inconvenient in use.

Additionally, there has been proposed a micro controlled voltage transformer, which is provided on its outer surface with mechanical buttons for selecting the output voltage values. The different buttons can be pressed in order to select and regulate the output voltages, but in one aspect the possibility of false touch generation is high. The output voltage may be changed when false touch is created especially during power supply, thereby causing a decrease in the life span of the electrical product, even the safety problem and poor reliability. Besides, the use of more expensive mechanical buttons would increase the cost of the voltage transformer.

SUMMARY OF THE INVENTION

Accordingly, an object of the present invention is to provide an extremely safe voltage transformer with a sequentially switchable voltage selection circuit that cannot supply power when it is switched to change voltages.

Another object of the present invention is to provide a voltage transformer with a sequentially switchable voltage selection circuit that can be switched to change output voltages only through feedback and can prevent the switching of the voltage transformer from false touch during power supply.

A further object of the present invention is to provide a voltage transformer with a sequentially switchable voltage selection circuit, whose output voltage values are clearly displayed so that it is uneasy to misjudge them.

A still further object of the present invention is to provide a voltage transformer with a sequentially switchable voltage selection circuit that can output feedback verifiable and self-calibrating voltages.

Therefore, a voltage transformer with a sequentially switchable voltage selection circuit according to the present invention is provided for converting the voltage value of input electrical energy into one of a plurality of predetermined output voltage values and outputting the electrical energy, comprising: a body, which is formed with at least one socket portion, and has an input port for receiving the input electrical energy and an output port for outputting output electrical energy having one of the plurality of predetermined output voltage values; an input port for receiving said input voltage; an output port for outputting one of the plurality of predetermined output voltages; a connection device for correspondingly plugging in the socket portion; a sequentially switchable voltage selection circuit, which is arranged within the body with its two ends electrically connected to the input port and output port respectively, including a voltage transformation unit; and a micro control unit, which is electrically connected to the voltage transformation unit and the socket portion, and has a clock generator for generating a clock signal that enables a sequential change in a voltage value sent to the voltage transformation unit when the connection device is plugged in the socket portion; and a display device for displaying the voltage value of the electrical energy outputted from the output port.

Furthermore, the micro control unit comprises a set of switch that is selectively electrically connected to the different circuit elements, and a microprocessor that is electrically connected to the socket portion and actuates the switch.

The switch connects the different circuit elements to the voltage transformation unit one by one through the feedback drive of the connection device, thereby changing the output voltage. This operation must be done by the user so there is no worry about false touch generation; and the connection device itself can be a connector for connecting the output port to the an electrical product such that when it is switched to output the voltages, it completely fails to supply power at the same time, thus eliminating the risk of damaging the product; there is no design of external parts so the hassle of carrying and losing the parts can be reduced. Particularly, the voltage display can be disposed at the power supply end to give the user clear information; and when it is switched to output the voltages, the output voltage values can be further feedback detected and self-calibrated. It can be said to kill several birds with one stone.

DETAILED DESCRIPTION OF THE PREFERRED EMBODIMENTS

The above-mentioned and other technical contents, features, and functions of the present invention are clearly illustrated in the following detailed description of the preferred embodiments in coordination with the reference drawings.

Figure 4:
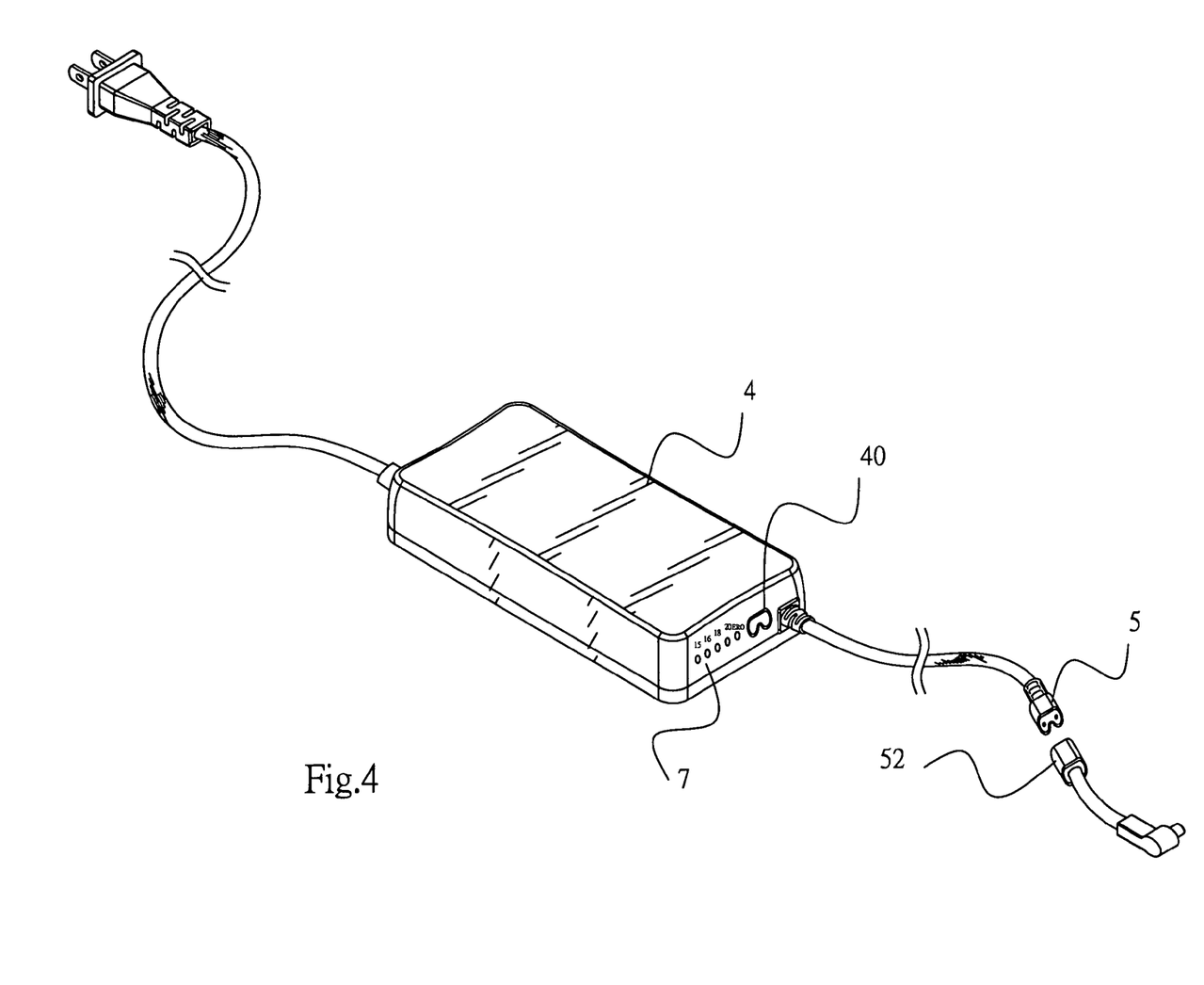
FIG. 4 is a three-dimensional schematic view of a first embodiment according to the present invention.
Figure 5:
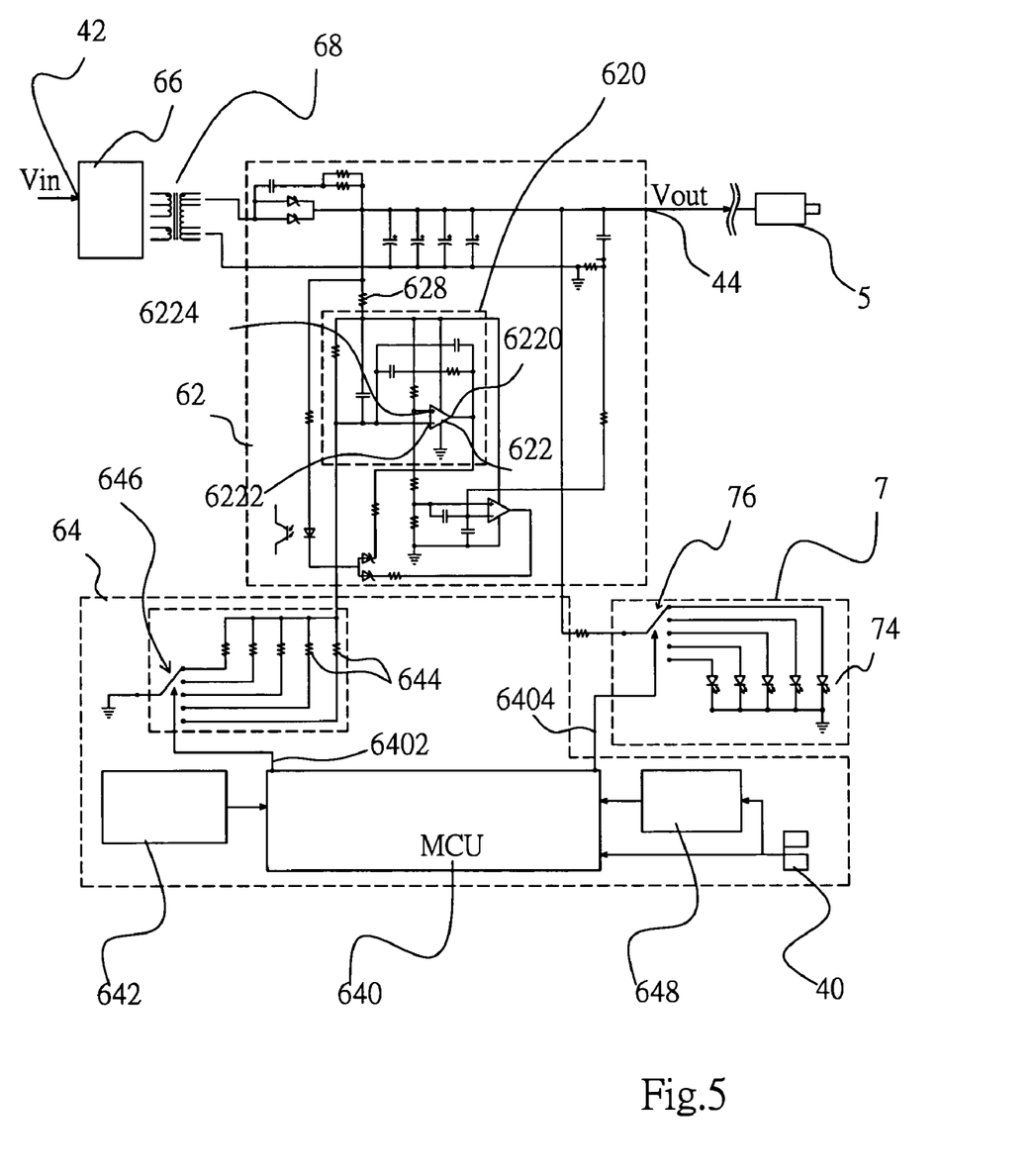
FIG. 5 is a schematic view showing the circuit of a first embodiment according to the present invention.

FIGS. 4 and 5 are a schematic view showing the appearance of and a schematic view showing the circuit of a first embodiment according to the present invention. In this embodiment, a general indoor power is taken as an example so that its input voltage is 110 volt AC, definitely, it will be readily apparent to those skilled in the art that the input voltage may also be 220 volt AC, or such as automotive 12 volt DC.

In this embodiment, the above input voltage Vin as electrical energy passes through a plug which serves as an input port 42, and is inputted into the circuits within the body 4, and an output voltage Vout, which is obtained from a voltage change generated by a sequentially switchable voltage selection circuit, passes through an output port 44 for outputting the electrical energy and an output conducting wire, which is electrically connected to a connection device 5, and then is supplied to an electrical product which utilizes the output electrical energy through a specific bayonet socket 52. Of course, it will be readily apparent to those skilled in the art that the connection device 5 itself can be designed to be butt-connected to an electrical product so it does not necessarily require an additional bayonet socket.

In this embodiment, the sequentially switchable voltage selection circuit mainly comprises a voltage transformation unit 62 and a micro control unit 64 except for an input side circuit 66 and a voltage transformer coil 68. Also, in this embodiment, the voltage transformation unit 62 further comprises a voltage regulator circuit 620 having an amplifier 622, which has an inverting input end 6222 connected to the output port 44 via such as a resistor 628, a non-inverting input end 6224 for providing reference voltages, and an output end 6220 feedback-connected to the inverting input end 6222.

The micro control unit has a microprocessor 640, a switch 646 and a plurality of different circuit elements each having different electrical properties (e.g. resistance values). In this embodiment, five resistors 644 exemplified as circuit elements are electrically connected to the inverting input end 6222 of the above amplifier 622 with their one ends respectively. The body 4 has at least one socket portion 40 formed thereon to serve as the socket portion, and the socket portion 40 is provided therein with a terminal that is electrically connected to the microprocessor 640. When the connection device 5 is plugged in the socket portion 40, the microprocessor 640 would be activated. Of course, in practical use, a protruding socket portion can be selectively formed on the body, and the connection device is provided with a female contact for the corresponding insertion.

In this embodiment, the microprocessor 640 is electrically connected to the switch 646 through a voltage control end 6402 on the one hand to enable the switch to be alternately switched such that the other ends of the resistors 644 having different values are in turn connected to the ground. The voltage at the inverting input end 6222 follows the reference voltage at the non-inverting input end 6224 as well as the other end of the resistor 644 selectively connected by the foregoing switch 646 is grounded, so that the resistance ratio of the resistor 644 to the resistor 628 can determine the voltage value at the output port. Also, when the resistor 644 connected to the voltage transformation unit is changed, this ratio would be thus altered to cause a voltage change in the output electrical energy.

Figure 6:
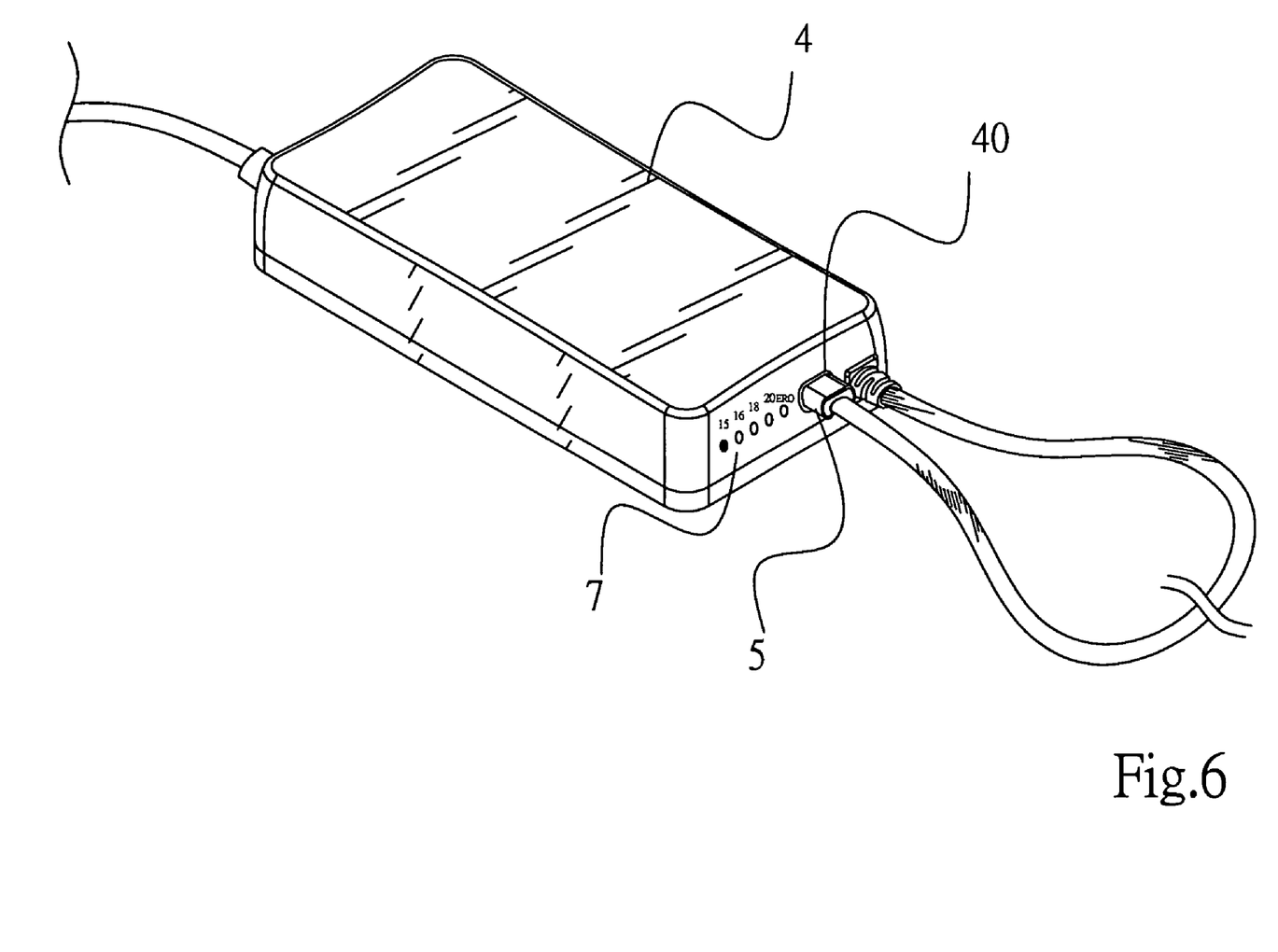
FIG. 6 is a three-dimensional schematic view showing the insertion of the connection device back into the socket portion according to the embodiment of FIG. 4 of the present invention, illustrating the operation of regulating the voltages.

On the other hand, a display control end 6404 of the microprocessor 640 is electrically connected to and initializes a display device 7. The microprocessor 640 cooperates with a clock generator 642 for generating a standard clock signal. Accordingly, when the above connection device 5 is plugged in the socket portion 40, as shown in FIG. 6, to activate the microprocessor 640, the switch 646 is initialized upon reception of the standard clock signal to alternately enable each various circuit element to connect the ground point and the inverting input end 6222 of the above amplifier 622 in accordance with a time sequence, for instance, at a speed of one change per 3 seconds. The output voltage Vout is consequentially changed as well until it is switched to an ideal voltage value and the user removes the connection device 5 from the socket portion 40 to stop the initializing signal outputted from the microprocessor 640. At this time, the switch 646 stops switching and is fixedly connected to a selected circuit element, thus maintaining a specific output voltage value to output the electrical energy. Of course, similar structures such as a stop button can be also utilized here to stop the signal outputted from the microprocessor 640 without interference with the implementation of the present invention.

To give the user correct information about the output voltage values, the display device 7 of this embodiment comprises a plurality of light emitting diodes 74 disposed at the body 4 and the surface of the body 4 is indicated with corresponding output voltage values, such as 15V, 16V, 18V, 20V and ERR (error) etc. Accordingly, when the voltage control end 6402 initializes the switch 646 to enable the output voltage Vout to be sequentially and alternately changed, the display control end 6404 initializes a display switch 76 in the display device 7 synchronously to enable the corresponding LED to emit light such that output voltage values are in turn correctly displayed until the user views the output voltage value meeting the requirement and then removes the connection device 5 from the socket portion 40. At this time, the output voltage is selected, and the LED 74 is synchronously selected and changed no more.

To further provide the effect of feedback monitoring, the microprocessor 640 of this embodiment is further connected with a voltage sensor 648 that is electrically connected to the socket portion 40. When the connection device 5 is plugged in the socket portion 40, the output voltage values are fed back to the voltage sensor 648 and the microprocessor 640 monitors whether the output voltage Vout is accurate or not. If it deviates from a predetermined value, the display switch 76 is initialized to jump to the LED indicating ERR so as to warn the user, even to simultaneously initialize the switch 646 to break the circuit, thus eliminating the risk of damaging an electrical product due to erroneous output voltages.

Thus, when power is supplied to an electrical product, the connection device 5 must be located in the feeder circuit and cannot be plugged back into the socket portion 40 so it is sure that the voltage value of the output electrical energy would not be changed by mistake. On the contrary, if it is desired to change the output voltage, the connection device needs to be plugged back into the socket portion 40 and power cannot be supplied simultaneously. Not only can the risk of false operation of the prior art be eliminated, but the cost of using expensive mechanical switching elements can be also reduced.

Figure 7:
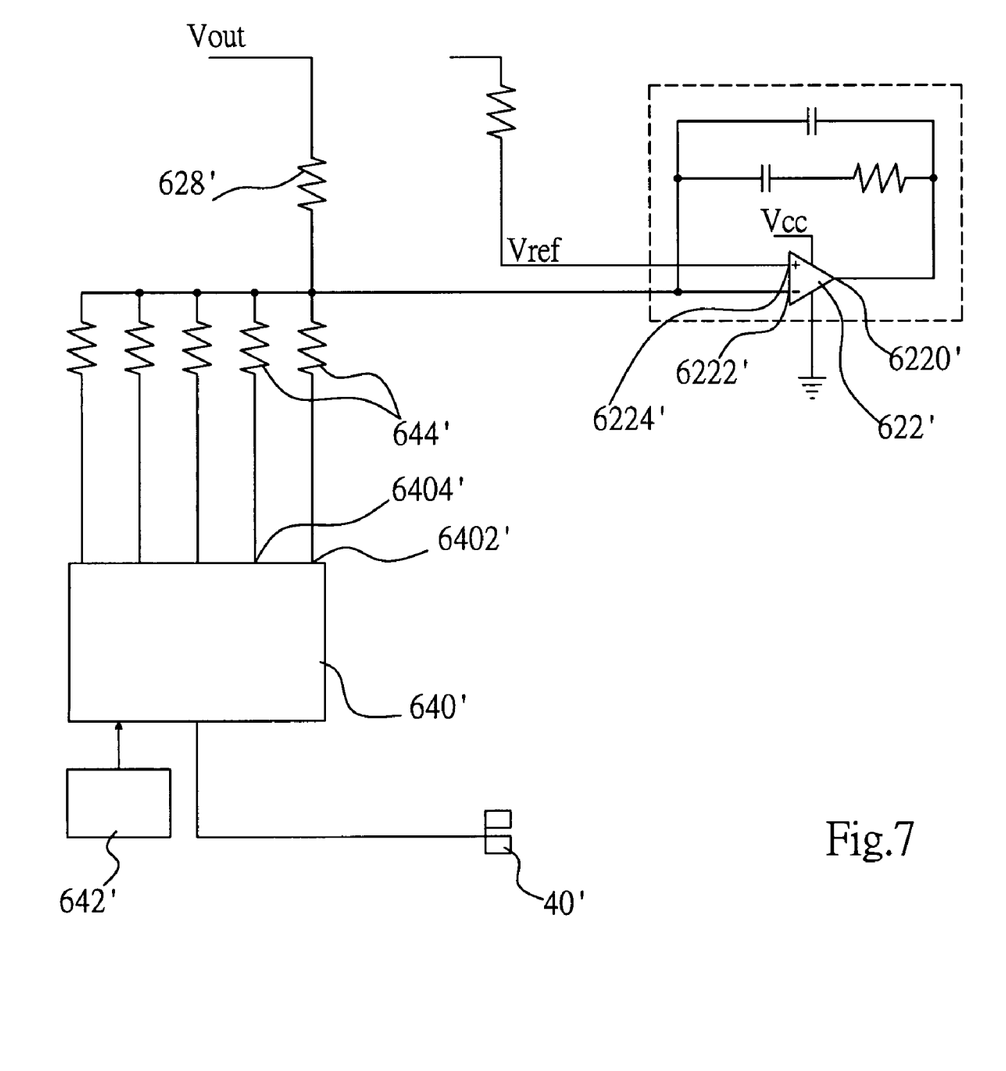
FIG. 7 is a schematic view showing the circuit of a second embodiment according to the present invention.

Furthermore, due to increasingly new functions of integrated circuit components, it is not necessary to arrange the foresaid microprocessor and switch separately. As shown in FIG. 7, they can be also integrated in a single microprocessor 640'. The microprocessor 640' is electrically connected to circuit elements 644' having different values respectively by multiple pins to allow zero potential outputted from, for instance, a contact 6402', thus selectively connected to its corresponding circuit element 644'. At this time, the potential at the non-inverting input end 6224' of the amplifier 622' is a reference voltage $V_{ref}$, and the output end 6220' is feedback-connected to the inverting input end 6222' to enable it to follow the potential $V_{ref}$ at the non-inverting input end 6224'. The output voltage is proportionally determined in accordance with the ratio of the corresponding circuit element 644' to the circuit element 628'.

After the connection device is plugged in the socket portion 40', the microprocessor of the micro control unit in turn switches the connected contact to, for example, 6404'. Consequentially, the value of the circuit element 644' varies as well, and its ratio to the circuit element 628' is also changed, thereby changing the voltage outputted from the voltage transformation unit to output the electrical energy.

Figure 8:
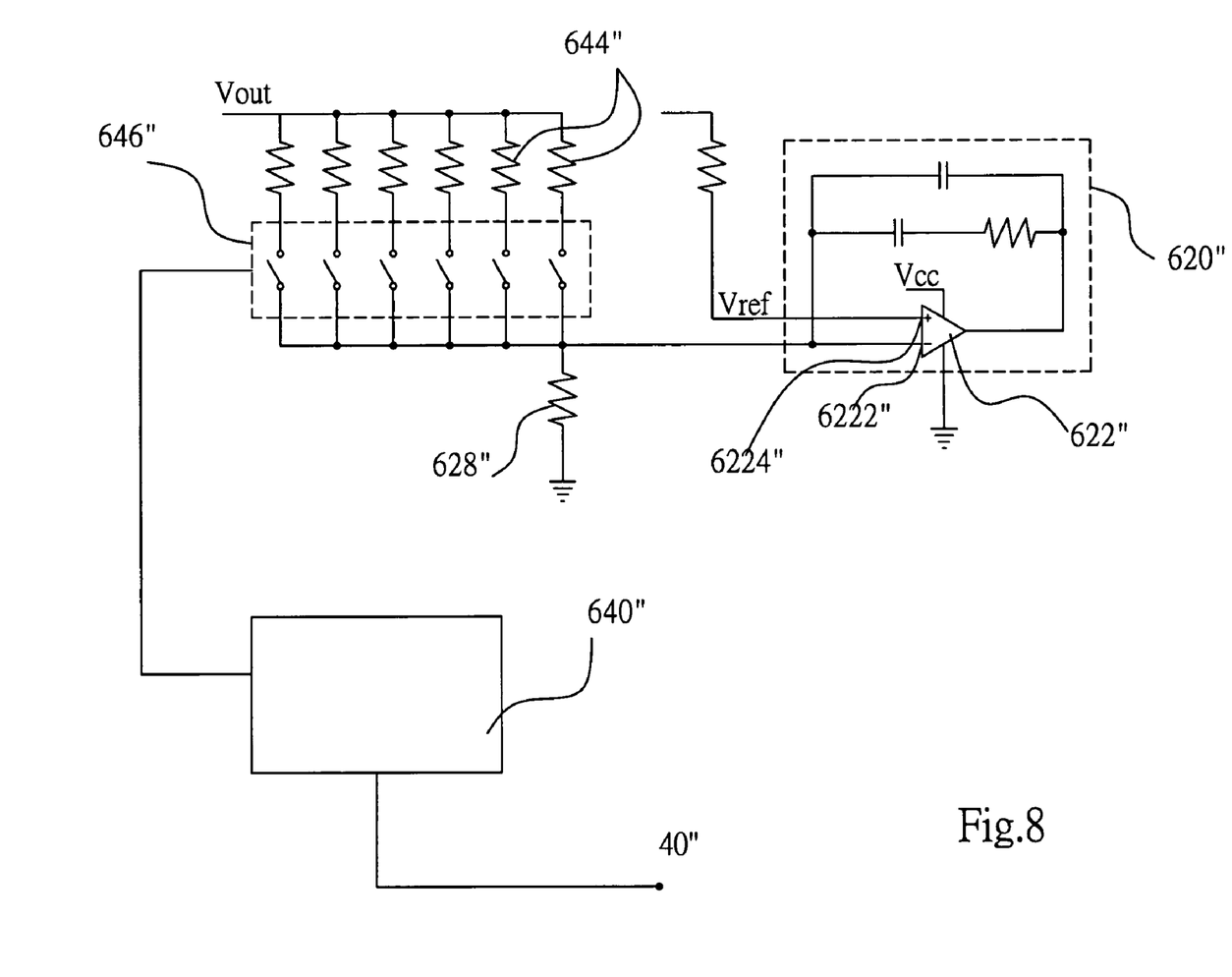
FIG. 8 is a schematic view showing the circuit of a third embodiment according to the present invention.

Of course, as will be readily apparent to those skilled in the art, it is not restricted that the foresaid multiple circuit elements are alternately connected between the inverting input end of the amplifier and the ground. Also, as shown in FIG. 8 for a third embodiment of the present invention, in the voltage regulator circuit 620", the reference voltage $V_{ref}$ is similarly inputted into the non-inverting input end 6224" of the amplifier 622", which is fixedly connected to the resistor 628" between the ground and the inverting input end 6222". The microprocessor 640" controls the switches 646" to enable the different circuit elements 644" to alternately connect between the output port and the inverting input end 6222", and the effect of changing the resistance ratio of the resistors at the two sides can be similarly achieved, thereby changing the output voltage value.

Figure 9:
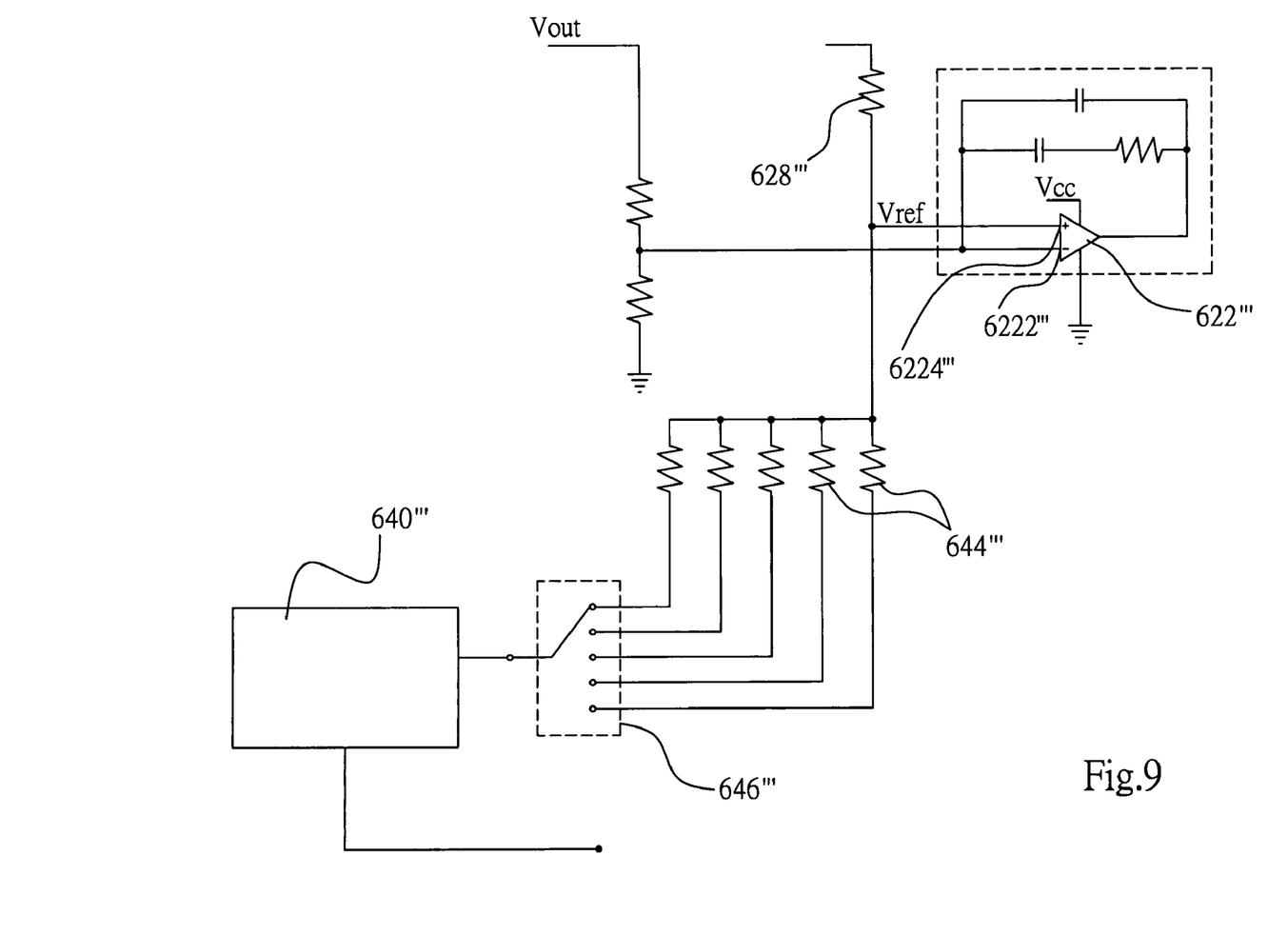
FIG. 9 is a schematic view showing the circuit of a fourth embodiment according to the present invention.

Moreover, as shown in FIG. 9 for a fourth embodiment of the present invention, in the voltage regulator circuit, the resistance ratio of the resistors at the two sides of the inverting input end 6222''' of the amplifier 622''' can be fixed, and the multiple switches 646''' are conduction-connected to the microprocessor 640''', and the different resistors 644''' are changed and connected to the non-inverting input end 6224'''. Thus, the resistance ratio of the resistors 644''' to 628''' at the two sides of the non-inverting input end 6224''' is changed to determine the reference voltage value at the non-inverting input end 6224''', and the voltage at the inverting input end 6222''' would follow the reference voltage, thus changing the final output voltage value.

Figure 10:
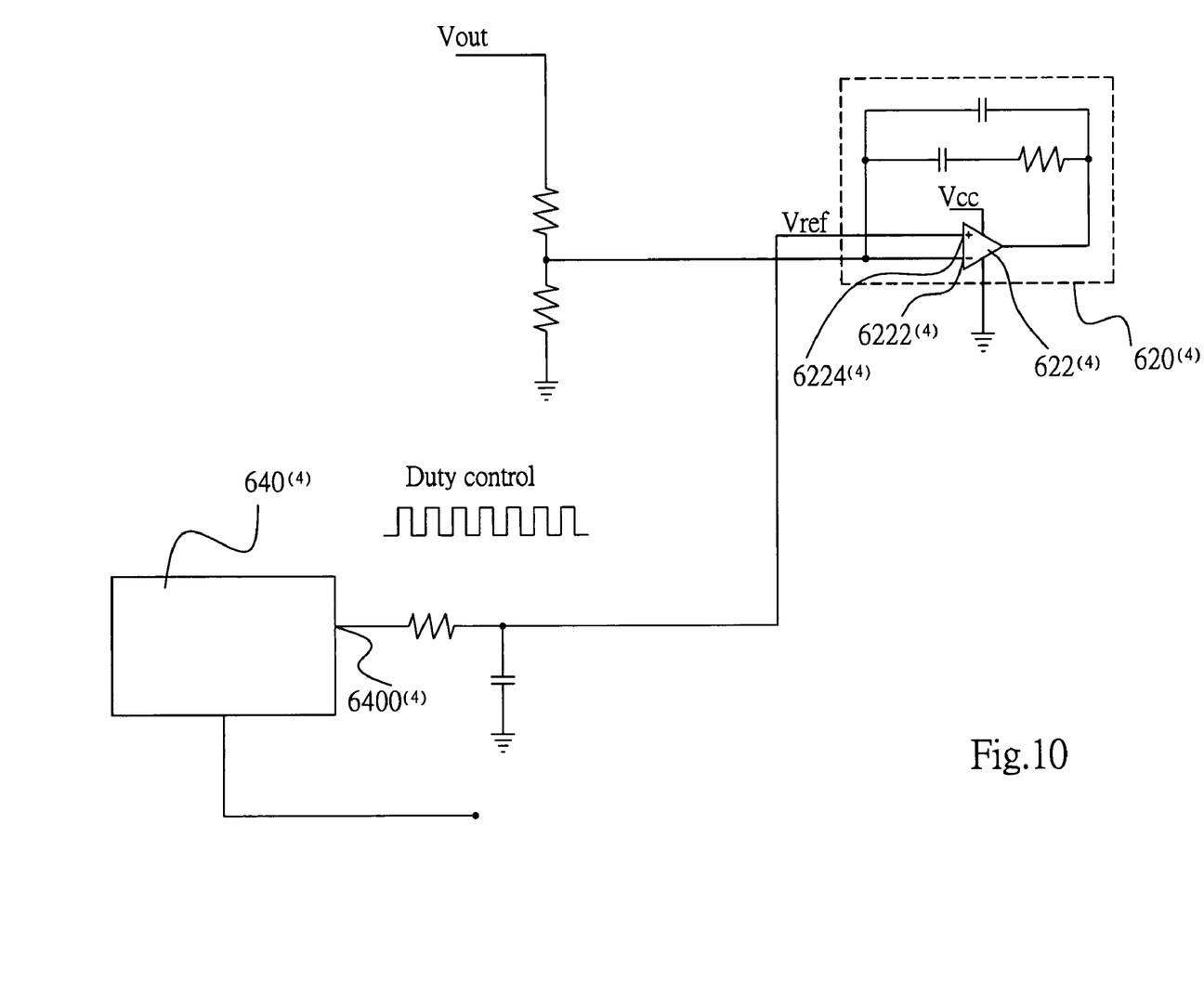
FIG. 10 is a schematic view showing another voltage transformer with adjustable output voltage of a fourth embodiment according to the present invention.

Still further, as shown in FIG. 10 for a fourth embodiment of the present invention, in consideration of a microprocessor 640'''' having an output end 6400'''', when the above connection device is plugged in the socket portion, the output end 6400'''' would regulate and change the high level pulse width of each cycle in accordance with a time sequence, thereby changing the duty cycle ratio. As a result, in the voltage regulator circuit 620'''', the reference voltage at the non-inverting input end 6224'''' consequently fluctuates, and the voltage at the inverting input end 6222'''' would follow the reference voltage as well. Of course, this pulse width modulation can be also applied to the inverting input end of the amplifier 622'''', and the effect of changing the output voltage can be achieved by changing its duty cycle ratio.

Figure 11:
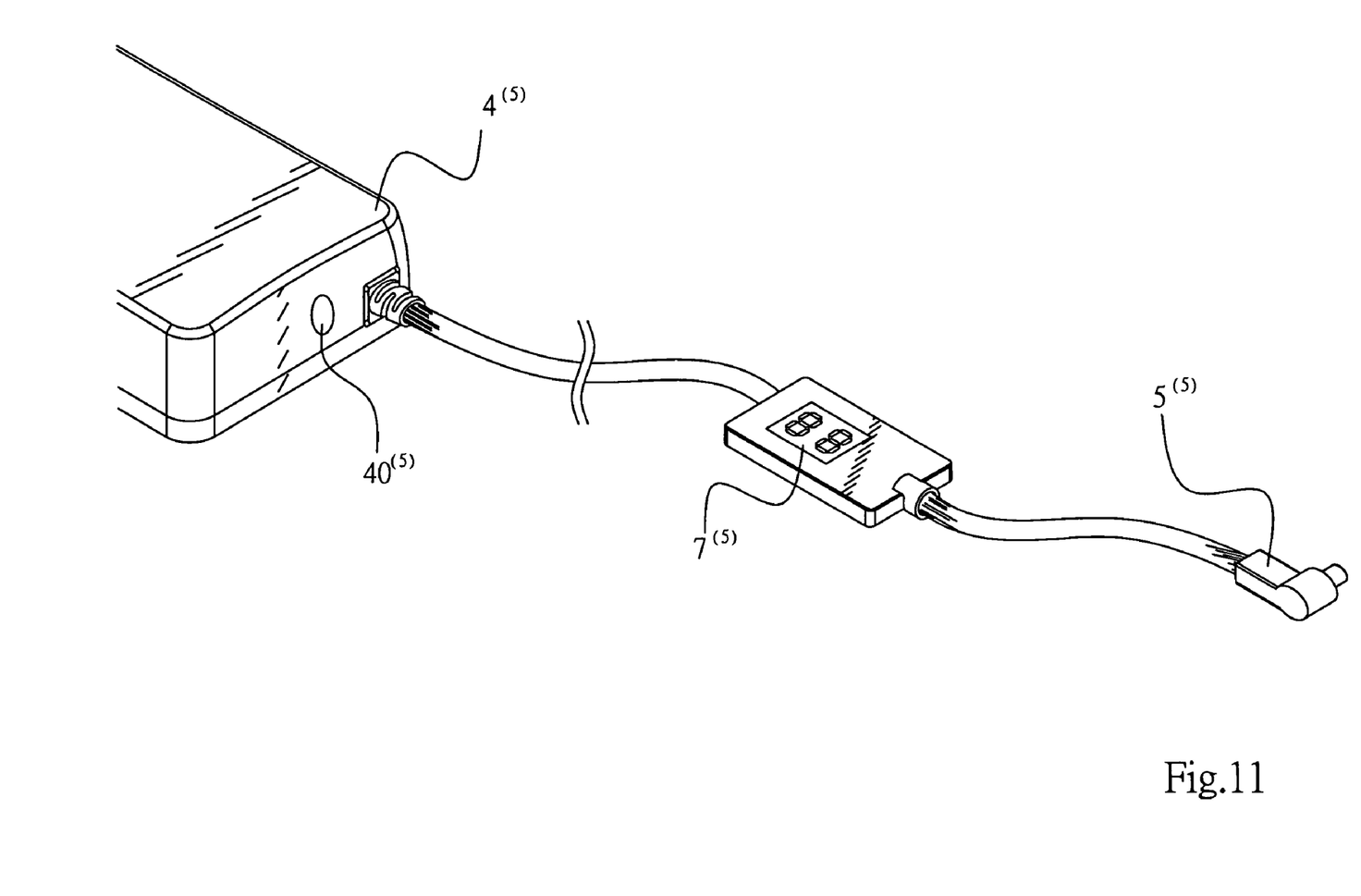
FIG. 11 is a three-dimensional schematic view of a fifth embodiment according to the present invention.

Of course, as will be readily apparent to those skilled in the art, a plurality of LEDs used as a display device is not the only choice. In consideration of that a voltage transformer is frequently inserted into an indoor socket on a wall, or inserted into a cigar lighter socket mounted in a motor vehicle, if a display device is arranged on the body, it is not necessarily convenient for the user to view the display device. Therefore, as shown in FIG. 11 for a fifth embodiment of the present invention, a liquid crystal display $7^{(5)}$ can be also selectively disposed outside the body $4^{(5)}$, on a connection line close to the connection device $5^{(5)}$. It is easy for the user to see the display of output voltage values while plugging the connection device $5^{(5)}$ back into the socket portion $40^{(5)}$ or removing it from the socket portion $40^{(5)}$, so as to further meet the design for human factors engineering. Particularly, due to heat release of the display device, the adverse effect on the body, which originally gives out heat, can be avoided by the arrangement of the display device outside the body.

From the disclosure of the present invention, it is not only provided a voltage transformer with a simpler structure, but also the possibility of losing parts can be effectively reduced. Above all, the voltage transformer cannot be erroneously touched to switch and change the output voltage during power supply and cannot supply power when it is switched to change the output voltage, thereby increasing the safety. Furthermore, the output voltage values are clearly displayed and the user must remove the connection device to select an output voltage, thus significantly reducing the possibility of misjudgment. In addition, the display device can be disposed close to a handheld position, not limited to the voltage transformer body, so as to meet the design for human factors engineering. Particularly, the output voltage values can be feedback detected and self-calibrated, thereby further eliminating the risk of erroneous outputs and providing high safety for a user.

What has been described above are the preferred embodiments of the present invention only, it is not intended to limit the scope of practice of the present invention, in principle, any equivalent variation and modification made according to the claims and specification should be included within the scope of the claims.

What is claimed is:

1. A voltage transformer with a sequentially switchable voltage selection circuit for converting the voltage value of input electrical energy into one of a plurality of predetermined output voltage values and outputting the electrical energy, comprising:
    a body, which is formed with at least one socket portion, and has an input port for receiving the input electrical energy and an output port for outputting output electrical energy having one of the plurality of predetermined output voltage values;
    a connection device for correspondingly plugging in the socket portion;
    a sequentially switchable voltage selection circuit, which is arranged within the body with its two ends electrically connected to the input port and output port respectively, including
        a voltage transformation unit; and
        a micro control unit, which is electrically connected to the voltage transformation unit and the socket portion, and has a clock generator for generating a clock signal that enables a sequential change in a voltage value sent to the voltage transformation unit when the connection device is plugged in the socket portion; and
    a display device for displaying the voltage value of the electrical energy outputted from the output port.

2. The voltage transformer as claimed in claim 1, wherein the micro control unit further comprises a microprocessor electrically connected to the socket portion.

3. The voltage transformer as claimed in claim 2, wherein the micro control unit further comprises a plurality of circuit elements, which have different values from each other and are actuated by the microprocessor to be sequentially and alternately connected to the voltage transformation unit.

4. The voltage transformer as claimed in claim 2, wherein the micro control unit further comprises:
    a plurality of circuit elements having different values from each other; and
    a switch, which are electrically connected to the circuit elements and actuated by the microprocessor to selectively electrically connect one of the different circuit elements to the voltage transformation unit.

5. The voltage transformer as claimed in claim 2, wherein the voltage transformation unit comprises an amplifier having an inverting input end, a non-inverting input end and an output end feedback-connected to the inverting input end, and the microprocessor has a pulse width modulation output end that outputs a sequential change of its duty cycle ratio when the connection device is plugged in the socket portion.

6. The voltage transformer as claimed in claim 3 or 4, wherein the voltage transformation unit comprises an amplifier having an inverting input end, a non-inverting input end and an output end feedback-connected to the inverting input end, and the circuit elements are electrically connected to the inverting input end of the amplifier respectively.

7. The voltage transformer as claimed in claim 3 or 4, wherein the voltage transformation unit comprises an amplifier having an inverting input end, a non-inverting input end and an output end feedback-connected to the inverting input terminal, and the circuit elements are electrically connected to the non-inverting input end of the amplifier respectively.

8. The voltage transformer as claimed in claim 1 wherein the micro control unit further comprises a voltage sensor that is electrically connected to the socket portion for feedback monitoring the output voltage values when the connection device is plugged in the socket portion.

9. The voltage transformer as claimed in claim 1 further comprising a bayonet socket with its one end connected to the connection device and the other end connected to an electrical product.

10. The voltage transformer as claimed in claim 1 further comprising a connection line for outputting electrical energy with its one end electrically connected to the output port and the other end provided with the connection device.

11. The voltage transformer as claimed in claim 10, wherein the display device is disposed on the connection line for outputting electrical energy.

12. The voltage transformer as claimed in claim 1 wherein the display device is disposed on the connection line for outputting electrical energy.

13. The voltage transformer as claimed in claim 1 wherein the display device is a liquid crystal display.

14. The voltage transformer as claimed in claim 1 wherein the display device comprises a plurality of light emitting diodes and indicators corresponding to the light emitting diodes.

15. The voltage transformer as claimed in claim 1 wherein the display device is disposed at the body.

* * * * *